Aug. 4, 1931.　　　F. B. COCKBURN　　　1,816,960
APRON DISK TRANSMISSION MECHANISM
Filed Dec. 21, 1927　　　3 Sheets-Sheet 1

Inventor
Francis B. Cockburn
By Wood & Wood
Attorneys

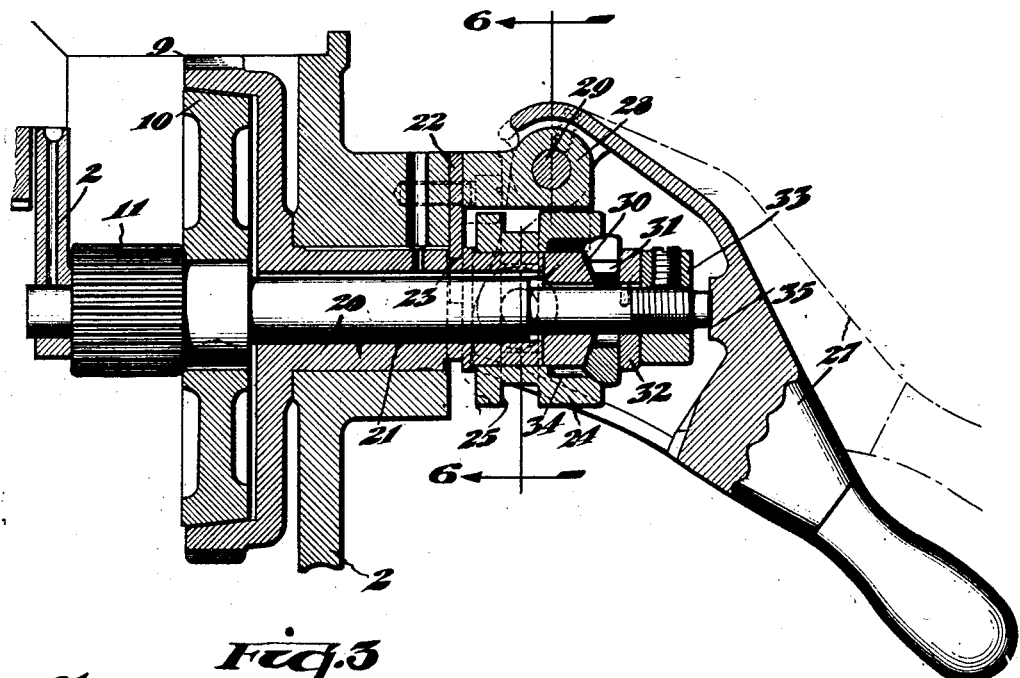
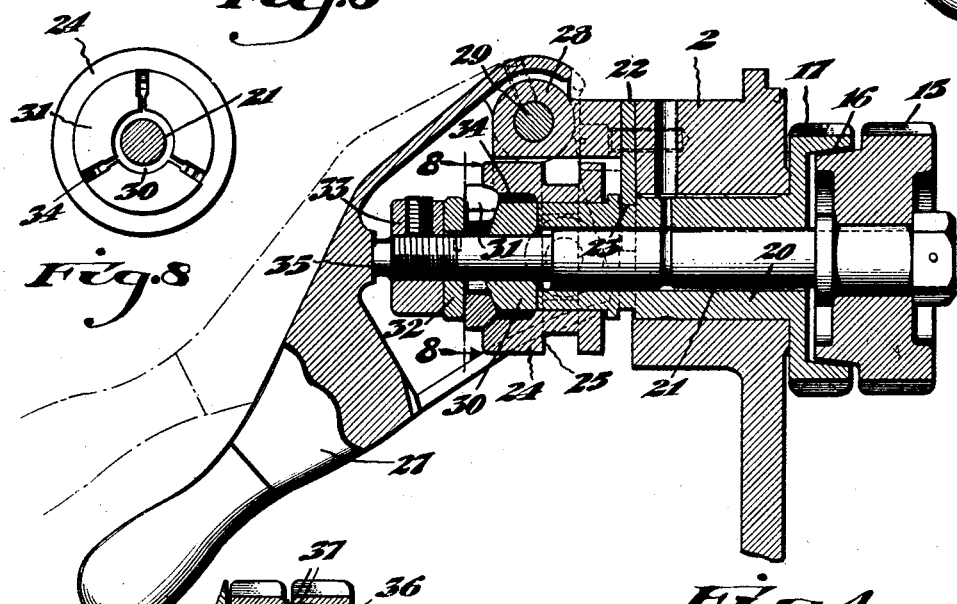
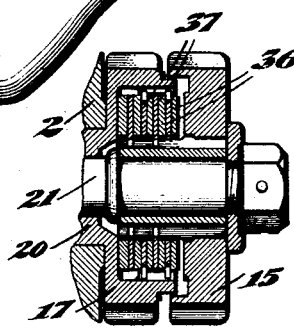

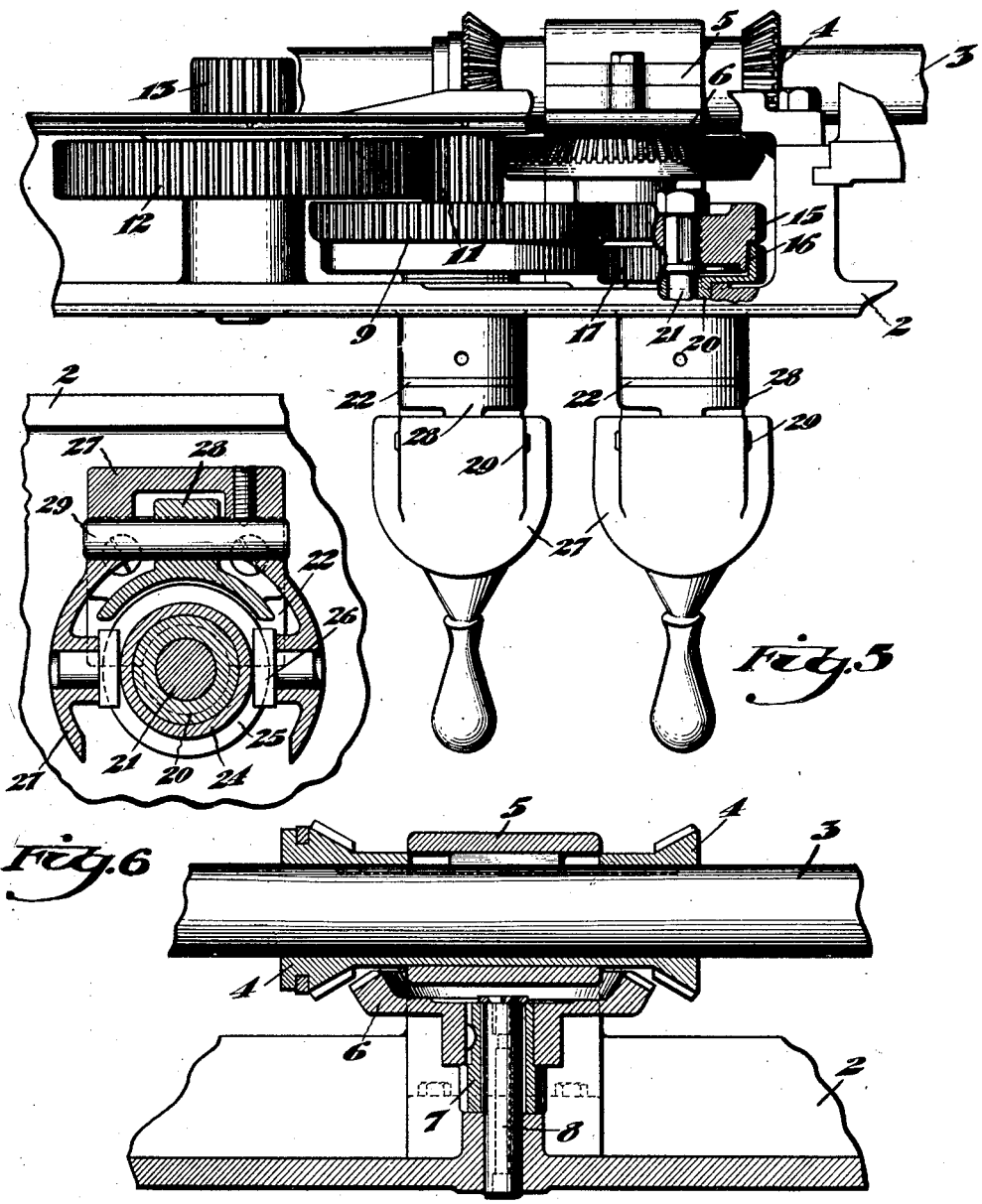

Patented Aug. 4, 1931

1,816,960

UNITED STATES PATENT OFFICE

FRANCIS B. COCKBURN, OF CINCINNATI, OHIO, ASSIGNOR TO THE LODGE & SHIPLEY MACHINE TOOL COMPANY, OF CINCINNATI, OHIO, A CORPORATION OF OHIO

APRON DISK TRANSMISSION MECHANISM

Application filed December 21, 1927. Serial No. 241,505.

This invention relates to friction clutch mechanism of compact arrangement and adaptable for mounting upon a lathe apron, and lever operated for providing a powerful friction means for feeding the carriage on the bed, or the cross slide on the carriage.

The prevailing practise for transmittingly connecting the gear for the carriage traverse, or the cross slide feed is by frictionally engaging a pair of adjacently disposed gears with the friction controlled and operated by a threaded knob accessible and extending from the forward or face side of the lathe apron, the knob locking or clamping the two friction mated members together thereby rotating with the gearing when the transmission is coupled. When the lathe is running at high speed the knob consequently revolves rapidly making it difficult for the operator to grasp for disengaging the frictions. The exposed rotating knob constantly presents an injury hazard to the operator and constitutes a hand knob with which the operator cannot turn with sufficient leverage to bring the frictions together under a pressure for connecting the driving members to carry the required cut. This results in considerable slippage between the friction surfaces so that frequent tightening is required.

With the present invention the friction clutch is operated by a hand lever normally stationary except when swung to operate the clutch members and can be conveniently located and easily operated to effectively engage the frictions under heavy leverage, reducing slippage between the friction surfaces and with less slippage the durability of the friction surfaces is increased. To engage the frictions, the lever is swung upwardly and for releasing is swung downwardly, the operator being required merely to strike the lever with force to sufficiently trip it, whereupon it will drop by gravity operating the clutch actuating parts and hold the clutch and parts in a released position under the weight of the lever.

The handle at is pivoted end is formed to house and guard the rotative parts of the friction controlling mechanism which extends or protrudes from the forward side of the apron thus eliminates the injury hazard and also protects the parts from the chips or cuttings of the lathe.

It is therefore an object of the invention to provide cooperating friction clutch members with an actuating rod or shaft fixed to one of the members and movable axially or longitudinally by a lever swinging on a pivot transverse of the shaft with the pivoted end of the lever housing and adapted to contact and move the shaft for clutch control.

Another object of the invention is to provide a lathe apron with friction operated disks respectively for the carriage travellers feed and a tool slide cross feed, each including driving and driven gears journalled upon the lathe apron adapted to be frictionally coupled with the controlling mechanism therefor mounted coaxially with the coupling gears accessible from the forward side of the lathe apron and actuated by a lever mounted upon the lathe apron formed to house the controlling mechanism and operatively connected therewith, the lever preferably being mounted for a releasing control, whereby the weight of the lever can be utilized for holding the parts in neutral or inactive position.

Further objects and features will be more fully set forth in a description of the accompanying drawings, forming a part of this specification, in which:

Figure 3 is a view similar to Figure 2 with the parts in an inactive position.

Figure 4 is an enlarged section on line 4—4, Figure 1, showing the gearing and control of the cross feed screw.

Figure 5 is an enlarged top plan view of the gearing carried by the apron, with portions shown in section.

Figure 6 is a section on line 6—6, Figure 3.

Figure 7 is an enlarged section on line 7—7, Figure 1.

Figure 8 is a section on line 8—8, Figure 4.

Figure 9 is a central section through a modified form of friction for connecting the concentrically mounted transmission gear upon the control rod, employing friction disks in lieu of the cone disk shown in Figure 4.

Figure 1:
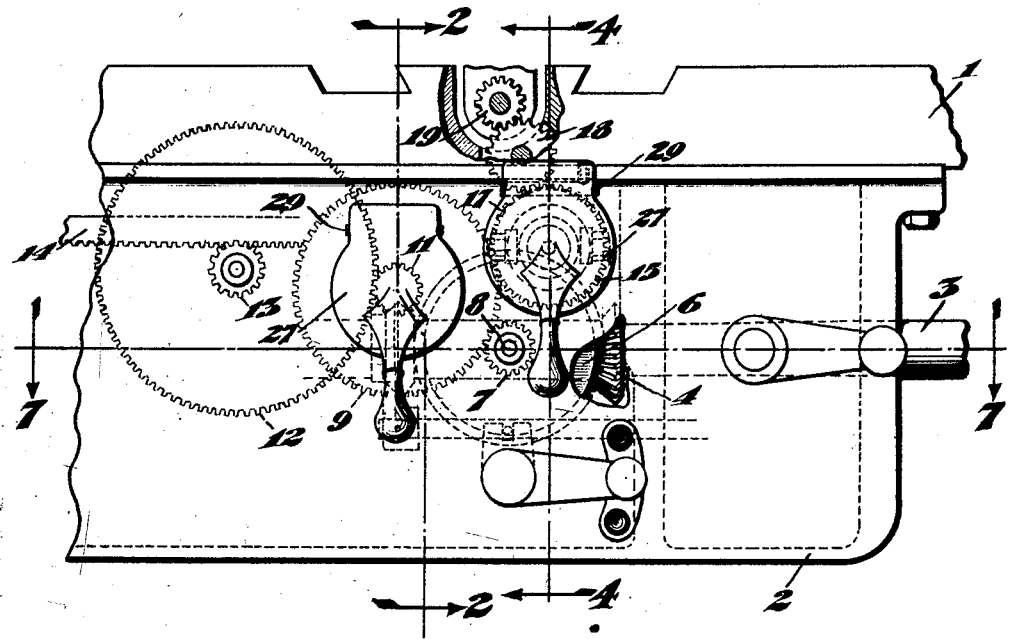
Figure 1 is a front elevation of the intermediate portion of a lathe apron containing the improved transmission mechanism and control for the traversing feed of the apron and carriage and the cross feed of the tool holding slide, a portion being broken away to illustrate the construction of certain parts which would otherwise be hidden.

As the invention is primarily disclosed in connection with a transmission mechanism carried by the carriage apron of a lathe for either feeding or translating the carriage upon the lathe bed or the tool slide in a cross feed upon the carriage, the structure in its particular embodiment is complete so that no illustration has been made of a full lathe organization, the drawings merely illustrating a portion of the lathe carriage apron carrying the transmission gearing.

Referring to the drawings, 1 indicates the cross plate of the carriage, which although not shown, is slidably mounted upon the rails of the lathe bed and carries the conventional type of tool cross slide. The cross plate has the usual depending apron 2 within which the transmission mechanism for traversing the carriage along the lathe bed and moving the cross slide upon the carriage is mounted. 3 indicates a feed or power shaft extending longitudinally of the lathe bed and in rear of the apron, and receives its power from the head end of the lathe and may be referred to as a driving shaft for transmitting the gearing carried by the apron.

Figure 2:
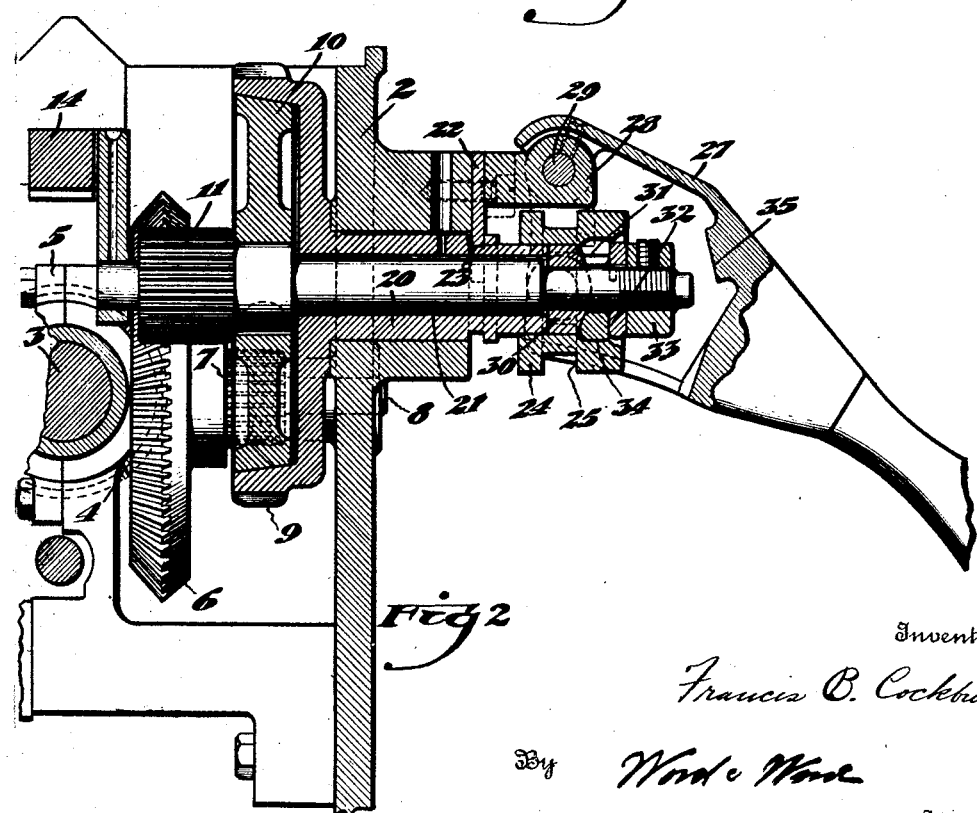
Figure 2 is an enlarged section on line 2—2, Figure 1, showing the control mechanism for the traverse feed of the carriage, with the mechanism shown in its active position.

The shaft is splined longitudinally and extends through and rotatively connects with a double bevel gear sleeve 4 which is journalled and slidable within a bearing 5 mounted on the apron. The gears of the sleeve 4 are adapted to be alternately engaged with a single bevel gear 6 keyed upon the hub of a pinion 7 revolving loosely upon a stud 8 extending from the apron as shown in Figure 7. The pinion 7 engages with a gear 9 and has an internal cone friction (see Figures 2 and 3) formed in the face thereof for engagement with the friction face of the friction disk 10 keyed on the hub of a pinion 11. The pinion 11 engages with a gear 12 (see Figure 1) connected with a pinion 13 which in turn meshes with a rack 14 secured to the lathe bed. This gearing provides the transmission for traversing or feeding the carriage longitudinally of the lathe bed when the friction gear 9 and friction disk 10 are engaged.

The cross feed for the tool slide is obtained by a gear 15 meshing with gear 9. The gear 15 has an external cone friction 16 (see Figure 4) extending from the face thereof and engages into the internal cone friction in the face of a gear 17 concentric with the gear 15. The gear 17 meshes with an intermediate gear 18 which in turn meshes with a gear 19 keyed to the cross feed screw.

In both instances, the gear carrying the external cone friction members represents the movable element of the friction clutch actuated for clutching and unclutching with the gear having internal cone friction, the gears being compressibly engaged when clutched so as to rotate as a unit. Thus, for the carriage travelling control the gear 11 and its friction disk 10 are shifted and for the cross feed screw the gear 15 and its cone friction 16. The cone friction for the gear 15 is represented as formed integral with the gear while for the gear 11 a cone disk 10 is keyed to the hub of the gear, the different constructions being solely for convenience in manufacturing.

The gears 9 and 17 having internal friction surfaces are each provided with an extended hub journalled or bearinged in the apron and extended beyond the outer side of the apron to carry the mechanism for shifting the movable clutch elements. Likewise, in both instances, the movable clutch member with its gear is mounted upon a shaft concentrically engaged through the extended hub of its cooperating clutch member or gear in such relative position that the gearing friction clutch actuating or clutch controlling mechanism is very compactly arranged and adapted to be operated by a hand lever in a convenient location on the front face of the apron. The lever houses the rotating parts at the forward end which otherwise would protrude from the apron following the common screw practise of the rotating thread knob which is more or less objectionable as the knob necessarily rotates with the gearing when locked together, so that when the machine is running at high speed the knob is revolved rapidly and it is difficult to disengage due to its speed.

With the present improvement the hand lever is non-rotative and swings in a vertical direction for the clutch control, being moved upwardly for bringing the parts into clutching position and depressed or swung downwardly for releasing the same. The operator can quickly release it by merely tapping the lever, relying on the weight of the lever to move the parts for unclutching. With the lever greater power is obtained for throwing in the clutch or for increased durability of the friction surfaces as there is less slippage when the frictions are forcibly engaged.

As the clutching mechanism for both the traveller feed for the carriage and the cross feed for the tool slide are the duplicate of one another the description as to detail of construction will be directed to only one of them, although it will be equally applicable to both, so that the same reference numerals are employed for the corresponding parts of both clutches.

In the present instance, the gears formed with the internal friction surfaces constitute the driving gears while those carrying the external friction, the driven gears, and such distinction is used herein for designation only.

The driving gear as either the gear 9 or 17 has an extended hub 20 from one side thereof journalled in a bearing of the apron while the driven gear 11 or 15 is mounted upon a shaft 21 concentrically engaged and journalled in the hub 20 and extending beyond the end thereof and adapted to be shifted longitudinally while bringing the friction elements into or out of clutching engagement.

The hub 20 extends beyond the bearing of the apron and is confined or retained against axial movement by a yoke plate or half washer 22 fixed to the apron and engaged into an annular groove 23 in the hub. A spool 24 is slidably mounted upon the forward end of the hub and is provided with an annular groove 25 into which the oppositely disposed shoes 26, carried by the yokes of a hand lever 27, engage for shifting the spool upon the hub. The hand lever 27 is of yoke or hollow formation to enclose or cover the spool 24 and thrust collars mounted on the end of the shaft 19 cooperating with the spool and is pivoted to a bracket 28 by a pin 29. The bracket is suitably fixed to the apron over the yoke plate or half washer 22 by screws passing through the bracket and yoke plate.

The shaft 21 extends beyond the forward end of the hub 20 and is loose within the hub, one end carrying the driven gears which is adapted to frictionally engage with the driving gear for transmittingly connecting the gears and at its opposite ends carries an abutment collar 30, and a split segmental ring or compressible collar 31 disposed between the abutment collar and a washer 32 upon the shaft 21, the washer 32 being backed up by a nut 33 screw-threaded upon the shaft 21.

The outer face of the spool 24 is recessed to house the abutment collar which bears against the forward end of the hub 20 and is provided with an annular taper as at 34 for engagement with the segmental ring or compressible collar 31 for compressing the ring 31 in sliding the spool 24 forwardly so as to wedge the same between the washer 32 and abutment collar 30 to further separate said washer and abutment collar and thereby move the shaft 21 longitudinally for compressibly engaging the friction elements.

The opposing faces of the segment ring and abutment collar are mutually inclined for producing the wedging action between the washer and abutment collar when the segment ring is compressed. The segment ring, as disclosed in Figure 8, is preferably formed of three sections.

For the purpose of forcible and positive disengagement of the clutch members the hand lever is arranged to contact with the end of the shaft 21 as the lever is moved to its neutral or downward position, the lever being provided with a lug or contact point 35 for engagement with the end of the shaft 21. The hand lever thus directly engages the shaft so as to move the same for clutch release simultaneously with the movement of the spool, releasing the segment ring and which action will forcibly move the segments to an expanded or outward position and release the wedging influence between the washer and abutment collar.

In Figure 9, the frictionally coupled gears are shown as adapted to be clutched together by friction disks 36, 37, one set of disks 36 having a keyed connection with one gear and interposed between a second set 37 having a keyed connection with the second gear which may be substituted for the control type of friction. The structure and operation of the cone mechanism is substantially as heretofore described.

The friction controlling mechanism is coaxial with the gears frictionally coupled, some elements thereof being carried by one of the gears and other by the second gear for bringing the gears into and out of compressive engagement and forms a very compact arrangement for mounting upon the lathe apron, the gears being located on the one or rear side of the apron while the controlling mechanism for the friction is on the opposite or forward side of the apron so as to be accessible from the forward side of the apron and when the gears are coupled together rotate with the gears but are housed by the actuating lever which is non-rotative.

While the preferred arrangement of levers are made to swing readily to obtain the benefit of the gravity action for clutch release it is obvious that they could be otherwise directed. While the mechanism is shown in connection with the lathe in which its advantages are very apparent, the mechanism may be applied to other uses or in connection with other types of machine tools.

When the gears are frictionally clutched the abutment and collar 24 form a unit with the gears, with the pressure or force for bringing and holding the gears into clutching engagement sustained by the gears due to the wedge engaging between the relatively opposing abutments on the axes so that the rotating parts as a unit are all self-contained and the hand lever as a non-rotative part fulcrumed upon the apron merely serves to shift the collar 24 and forcibly disengage the gears aside from housing the axes of the gears and operating parts. All the strain exerted in forcing the two friction gears together is entirely contained in the revolved parts so that no pressure is exerted on any stationary part.

Thus, the gearing is not subjected to any end thrusts as would be the case if the forces were applied between a rotating and non-rotating part. The rotating parts are disengaged by the handle when it is brought into engagement with the end of the shaft positively disengaging the gears, preferably by a shock, as would be occasioned by throwing the handle downward forcibly striking the end of the shaft whereupon the shaft becomes stationary.

Having described my invention, I claim:

1. In a device of the class described, a support, a sleeve element journaled in said support, a shaft element journaled in said sleeve element, friction clutch means operative to couple said elements upon their relative longitudinal displacement, opposed abutments on said elements, an interrupted ring having wedge faces adapted to engage between said abutments upon radial contraction of the ring to displace the abutments and therewith their associated elements to engage the clutch means, and means to contract said ring.

2. In a device of the class described, a support, a sleeve element journaled in said support, a shaft element journaled in said sleeve element, friction clutch means operative to couple said elements upon their relative longitudinal displacement, opposed abutments on said elements, an interrupted ring having wedge faces adapted to engage between said abutments upon radial contraction of the ring to displace the abutments and therewith their associated elements to engage the clutch means, and means to contract said ring, said last-named means including a collar slidable on said sleeve and an operating lever pivoted to said support.

3. In a device of the class described, a support, a sleeve element journaled in said support, a shaft element journaled in said sleeve element, friction clutch means operative to couple said elements upon their relative longitudinal displacement, opposed abutments on said elements, an interrupted ring of compressible material having wedge faces adapted to engage between said abutments upon radial contraction of the ring to displace the abutments and therewith their associated elements to engage the clutch means, and means to contract said ring, said last-named means including a collar slidable on said sleeve and an operating lever pivoted to said support.

4. In a device of the class described, a support, a shaft journaled in said support and projecting rectangularly therefrom, a friction clutch in connection with said shaft, a longitudinally shiftable clutch operating collar surrounding the projecting end of said shaft, a lever pivoted to said support on an axis transverse to said shaft and engaging said collar to shift the same, means operated by the collar when the lever is moving away from the support to displace the shaft outwardly of the support and engage the clutch, and means on the lever adapted, when the lever is swung toward the support, to abut the end of the shaft.

5. In a device of the class described, a support, a horizontal shaft journaled in said support and projecting rectangularly therefrom, a friction clutch in connection with said shaft, a longitudinally shiftable clutch operating collar surrounding the projecting end of said shaft, a lever pivoted to said support on an axis transverse to said shaft and above the projecting end of the latter, said lever engaging said collar to shift the same and having a hollow portion enclosing the collar and shaft end above and laterally thereof.

6. In a device of the class described, a support, a shaft journaled in said support and projecting rectangularly therefrom, a friction clutch in connection with said shaft, a longitudinally shiftable clutch operating collar surrounding the projecting end of said shaft, a lever pivoted to said support on an axis transverse to said shaft and engaging said collar to shift the same, means operated by the collar when the lever is moving away from the support to displace the shaft outwardly of the support and engage the clutch, and means on the lever adapted, when the lever is swung toward the support, to abut the end of the shaft, said lever having a hollow portion enclosing the collar and shaft end above and laterally thereof.

In witness whereof, I hereunto subscribe my name.

FRANCIS B. COCKBURN.